F. P. KOBERT.
PROCESS AND MACHINE FOR MAKING CERTAIN ARTICLES OF MANUFACTURE.
APPLICATION FILED NOV. 18, 1916. RENEWED FEB. 11, 1920.

1,341,626.

Patented May 25, 1920.

Inventor
Frank P. Kobert
By his Attorneys
Edgar Tate & Co.

UNITED STATES PATENT OFFICE.

FRANK P. KOBERT, OF AMITYVILLE, NEW YORK.

PROCESS AND MACHINE FOR MAKING CERTAIN ARTICLES OF MANUFACTURE.

1,341,626.      Specification of Letters Patent.      Patented May 25, 1920.

Application filed November 18, 1916, Serial No. 132,003. Renewed February 11, 1920. Serial No. 358,003.

*To all whom it may concern:*

Be it known that I, FRANK P. KOBERT, a citizen of the United States, and residing at Amityville, L. I., in the county of Suffolk and State of New York, have invented a new and useful Process and Machine for Making Certain Articles of Manufacture, of which the following is a specification, such as will enable those skilled in the art to which it appertains to make and use the same.

This invention relates to what are known as heading, upsetting and forging machines and particularly to machines of this class which employ, or operate on, what is known as the hot process, and the object of this invention is to provide a machine of the class specified characterized by a new process of operation which involves a continuous succession of intermittent movements in the operation of feeding the material or workpiece into the machine and a continuous succession of intermittent movements in the operation of heating such material as it is fed into the machine, and with this and other objects in view the invention involves the process of operation hereinafter described together with means for electrically heating the material as it is fed into the machine; means for controlling the heat applied to said material; and means for automatically shutting off the heating element in the event of the stopping of the machine; together with improved means for operating the plunger in a horizontally operating machine of the class specified; improved means for moving the plunger die into different positions, the number of which is governed by the number of blows required to produce the desired article, means whereby the machine may be adapted for work of any kind or class within certain limits, and means whereby the machine may be used as a single blow machine, or as a multiple blow machine according to the nature of the work to be done.

My invention also involves numerous other details of construction which are disclosed in the following specification, of which the accompanying drawings form a part, in which the separate parts of my improvement are designated by suitable reference characters in each of the views, and in which:—

Fig. 8 a diagrammatic view of the improved heating element employed with the various parts connected therewith and indicating the operation of the same;

Fig. 9 a view similar to Fig. 3 but showing only a detail of the construction and on an enlarged scale; and, Fig. 9$^a$ a partial transverse section on the line 9$^a$—9$^a$ of Fig. 1 on an enlarged scale.

In the practice of my invention I employ a main frame 10 comprising parallel side members 11 and 12, the front end portions of which are joined by a cross head 13 forwardly of which is a recess or space 14.

Mounted in the rear end portion of the side frame members in suitable bearings is a crank shaft 15, the ends of which protrude through said frame members and are provided with fly wheels 16. Mounted on the crank of the crank shaft is a split bearing block 17 through which are passed rods 18 which extend forwardly, and slidably mounted on the front ends thereof is a head member 19 pivoted as shown at 20 in a forked head of a plunger carriage 21 mounted in suitable slideways 22 secured to the side frame members 11 and 12 by screws or similar devices 23. The front face of the carriage 21 is provided with an arc-shaped recessed portion 24 adapted to receive a headed pin 25 adjustably mounted in a plunger 26 slidably mounted in a plunger guide 27 pivoted in the central portion 28 of the main frame 10 as shown at 29.

Figure 6:
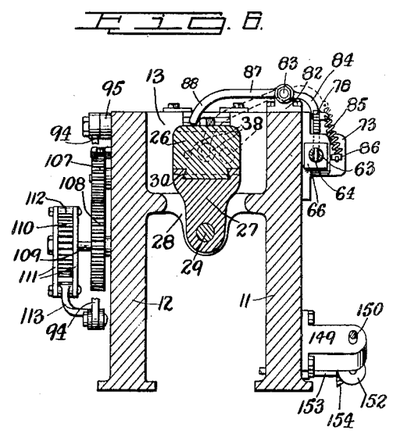
Fig. 6 a transverse section on the line 6—6 of Fig. 1.

The sliding connection of the plunger with the plunger guide is of a tongue and groove construction as shown at 30 in Fig. 6, but may be of any desired construction, and the plunger guide 27 is provided with a depending member 31 in which is mounted a backwardly directed pin 32. The rods 18 form connecting rods between the crank shaft and the carriage 21 and plunger 26, and mounted on said rods are adjustable collars 33 between which and the head 19 are mounted heavy coil springs 34, and said collars 33 may be adjusted on said rods by means of nuts 35. With this construction the power from the power or crank shaft is transmitted to the carriage 21 and plunger 26 through the springs 34, the rods 18 having a sliding connection with the head 19, as above set out, and with this construction the plunger 26 is provided with a release or cushioned in its operation.

Figures 3, 4:
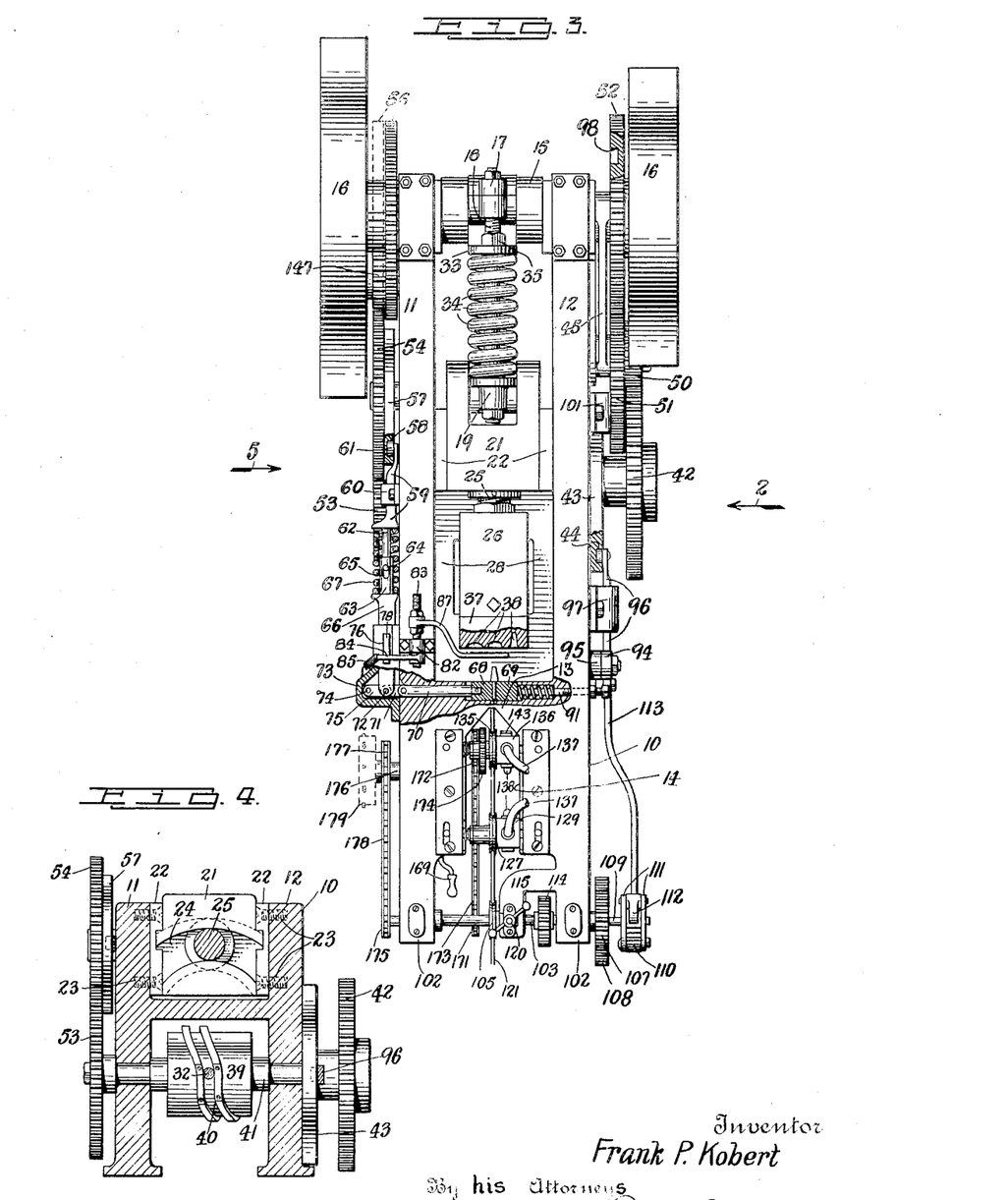
Fig. 3 a plan view of my improved machine with part of the construction broken away and part in section.
Fig. 4 a transverse section on the line 4—4 of Fig. 1.

The front face of the plunger 26 is provided with a recess 36 adapted to receive the shank of a suitable die 37 provided with a plurality of forming elements 38, as clearly shown in Fig. 3, said elements being arranged in the arc of a circle, as indicated in dotted lines in Fig. 6.

Mounted between the side members 11 and 12 of the frame centrally thereof and rearwardly of the plunger guide is a cam drum 39, the face of which is provided with a suitable cam groove 40 in which the pin 32 operates to move the plunger guide and plunger mounted therein into the desired position. The cam drum 39 is mounted on a shaft 41, one end of which passes through the side frame member 12 and is provided with a gear 42 and a cam wheel 43 is mounted on said shaft and provided in the face thereof with a cam groove 44.

Mounted on the end of the crank shaft passing through the side frame member 12 is an arm 45 adjustably connected with said side member of the frame by a bolt or screw passing through an elongated slot 47 formed in a side member 48 of said arm. Connected with the free end of the arm 45 on a stub shaft 49 is a pinion 50 which is adapted to mesh with the gear 42, and mounted on said stub shaft 49 is a gear 51 adapted to mesh with a gear 52 secured to the crank shaft 15.

The above described gear construction, involving the gears 52, 51, 50 and 42 are designed to drive the cam drum shaft 41 one complete revolution to three revolutions of the crank shaft, but as will be readily understood this ratio will be changed to correspond with the number of operations required for producing an article. In the construction shown, the various parts of the machine, for illustration, are shown to produce an article with three successive blows of the plunger.

The end of the drum shaft 41 passing through the side frame member 11 is provided with a gear 53 which meshes with a gear 54 mounted on a stub shaft 55, and a gear 56 is slidably mounted on the end of the crank shaft passing through the frame member 11, and is adapted to mesh, in one position, with the gear 54, as hereinafter described. The inner face of the gear 54 is provided with a cam member 57 having a cam groove 58 indicated in dotted lines in Fig. 5.

A rod 59 is slidably mounted in a keeper 60, the inner end of which rod is provided with a roller 61 which is adapted to operate in the cam groove 58. The front end of the rod 59 is reduced as shown at 62, and connected with a sleeve 63 by a pin 64 passing through an elongated slot 65 in said sleeve, said sleeve being connected with or forming a part of a supplemental rod 66, and mounted between the enlarged portions of the rod 59 and supplemental rod 66 is a heavy coil spring 67, the tension of which is sufficient to move the rod 66 forwardly in the forward movement of the rod 59 to close a split die which I employ, as hereinafter described.

Supported in the cross head 13 is a two-part or split die, consisting of separate parts 68—69, and connected with the die member 68 is a rod 70, to the free end of which is pivoted a link 71 also pivoted at 72 to the front end of the supplemental rod 66. The front end of said supplemental rod 66 is slidably mounted in a housing 73 secured to the side member 11 of the frame, and pivoted at 74 in said housing is another link 75 which is also pivoted to the front end of the supplemental rod 66, and this construction forms a toggle lever mechanism for moving the die member 68 to the right, to force the same against the die member 69 and hold it in such position during the operation of the plunger, as hereinafter described.

The top of the housing 73 is slotted as shown at 76, and passed through said housing is a pivot pin 77 on which is mounted a cam finger 78 having a downwardly directed forked extension 79. The supplemental rod 66 is slotted as shown at 80 to receive the downwardly directed extension 79, and a pin 81 is secured in said supplemental rod centrally of the slot 80 therein, and in connection with which the fork in the downwardly directed extension 79 operates. Secured to the top of the side frame 11 adjacent to the housing 73 is a bearing 82 through which is passed a threaded pin 83 to one end of which is secured a finger 84 having a bearing on the cam finger 78, and a spring 85 is connected with the end of the finger 84, and with the housing 73 as shown at 86.

Adjustably mounted on the other end portion of the pin 83 is a stop finger 87 which passes inwardly and is provided with a downwardly directed portion 88, the end of which is adapted to be moved into line with the center of the plunger as indicated in dotted lines in Fig. 6, and serves to limit the inward movement of the metal to be operated upon as it is fed into the machine through the die members 68 and 69, and it will be understood that the spring 85 serves to hold said stop finger 88 in the position shown in full lines in Fig. 6, the cam finger 78 serving to move said stop finger into the position shown in dotted lines in the operation of the rods 59 and 66 to open the die members 68 and 69, as hereinafter described.

Figures 8, 9, 9A:
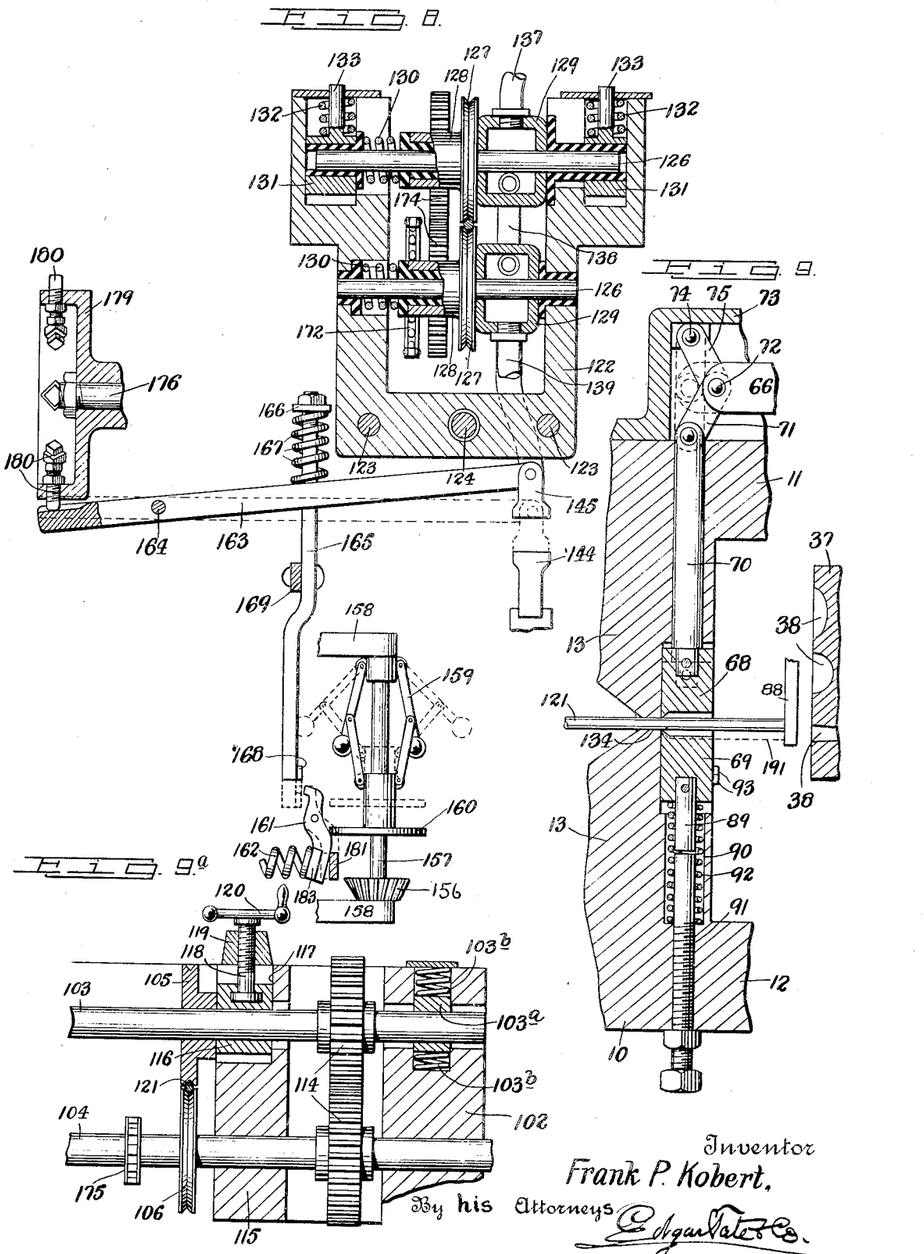

The die member 69 is provided with a pin 89 which passes through an aperture 90 formed in the corresponding side of the frame and is adapted to make contact with a pin 91 adjustably mounted in the side member 12 of the frame, and mounted on said pins is a coil spring 92 which serves to move the die member 69 toward the die member 68 to an extent limited by stop devices 93, as clearly indicated in Fig. 9, one of said stop devices being on the die member, and the other on the die bed of the machine.

The separate parts of the die members 68 and 69 are recessed centrally thereof, to receive the shank portion of the device to be made or headed, and the form of these recessed portions will be the same as in other dies of this class, the construction of which is adapted to support and hold the shank portion of the article to be formed in the operation of the plunger.

Figure 1:
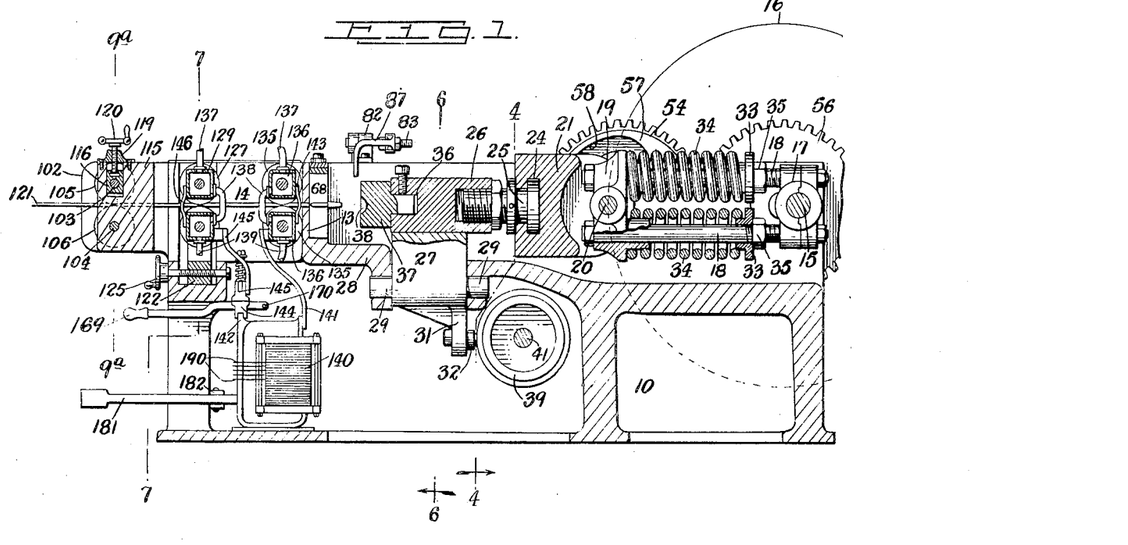
Figure 1 is a central sectional side view of my improved machine indicating the parts in operative position.
Figure 2:
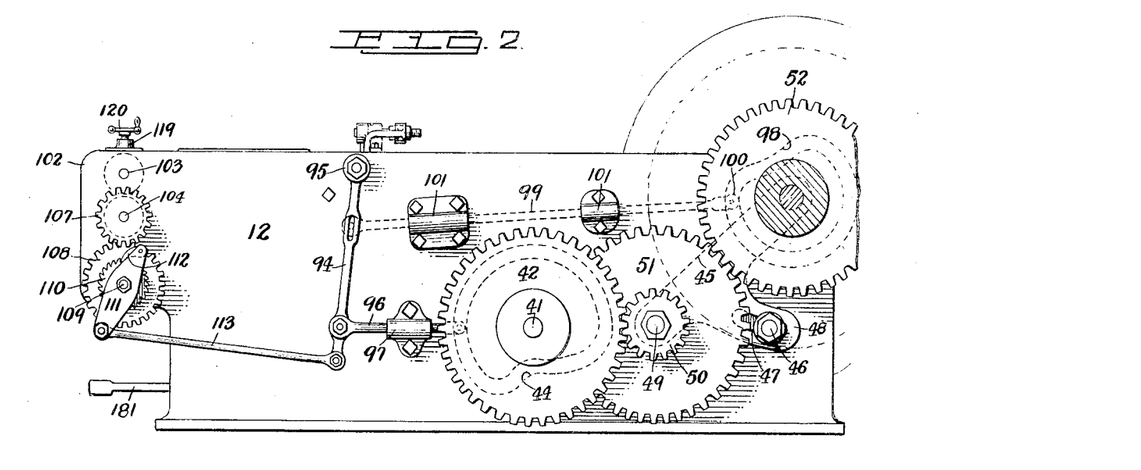
Fig. 2 a side view looking in the direction of the arrow 2 in Fig. 3 with part of the construction broken away.

A rock arm 94 is pivoted to a suitable stud 95 formed integral with the side member 12 of the frame, and pivotally connected with the lower edge portion thereof is a connecting rod 96 slidably mounted in a bearing 97, and the end of said rod is provided with a roller adapted to operate in the cam groove 44 in the cam 43. The inner face of the gear wheel 52 mounted on the end of the crank shaft having a bearing in the side frame member 12 is provided with a cam groove 98 similar to the groove 44. As indicated in dotted lines in Fig. 2 one end of a connecting rod 99 is connected with the rock arm 94, and the other end thereof is provided with a roller 100 adapted to operate in the cam groove 98, the same as in the connection of the rod 96 with the cam groove 44. The connecting rods 96 and 99 are mounted in suitable guide members 97 and 101.

When the connecting rod 96 is employed to operate the rock arm 94, the connecting rod 99 is detached from the machine, and when the rod 99 is employed to operate the arm 94 the rod 96 is detached, as hereinafter set out.

The front of the machine is provided with forwardly directed keepers 102 in which are mounted parallel shafts 103 and 104, and connected with said shafts centrally thereof are feed rollers 105 and 106. The shaft 104 is extended at one side and connected therewith is a gear 107 which meshes with a larger gear 108 mounted on a stub shaft 109, and connected with the outer end of said stub shaft is a ratchet wheel 110, on the opposite sides of which are mounted side plates 111, between the top portions of which is pivoted a pawl 112. Pivotally mounted in the bottom portion of said side plates is a connecting rod 113 which is also pivotally connected with the free end of the rock arm 94.

With this construction the operation of the rock arm 94 at intervals by the cam 43 will rotate the shaft 109 to an extent governed by the movement of said rock arm, and the shaft 104 will be rotated by the gear construction 107 and 108, and gears 114 are mounted on the shafts 103 and 104, whereby the rotation of the shaft 104 will rotate the shaft 103, and the feed rollers 105 and 106 mounted thereon.

A supplemental bearing 115 is connected with, or formed integral with one of the forwardly directed bearing members 102, and the shaft 103 passes through said supplemental bearing and an angular block 116 is mounted in a slot 117 in the supplemental bearing 115, and an adjusting screw 118 is rotatably connected with the top of said angular block and passes downwardly through a block 119 secured to the top of the supplemental bearing 115, and provided with a crank handle 120 whereby the tension of the roller 105 on the metal stock 121 in the form of a heavy wire may be adjusted to the desired extent. The shaft 103 also has a vertical movement in the frame members 102 which is accomplished by a block 103$^a$ mounted in the frame members 102 and tensional devices 103$^b$ mounted above and below said blocks, this construction being clearly shown in Fig. 9$^a$.

Adjustably mounted in the front portion of the machine is a heat roller supporting carriage 122 mounted on suitable slide rods 123, and a threaded shaft 124 is passed through said carriage and provided in the front end thereof with a crank wheel 125, whereby said shaft may be rotated to adjust said carriage forwardly and backwardly in the frame. Mounted in and insulated from said carriage are shafts 126 on which are rotatably mounted copper contact and heating rollers 127, one side of each of which is provided with a sleeve portion 128, and mounted on said shafts at the other side of said rollers 127 are contact casings 129 in the form of water jackets, and springs 130 are mounted in the carriage and adapted to bear on the sleeve portions 128 of the rollers 127 to force the same against the contact casings 129.

The ends of the upper shaft 126 are mounted in vertically movable bearing blocks 131, normally depressed by springs 132 mounted on pins 133, and by means of the bearing blocks and springs the upper roller 127 is given tension on the wire or other metal 121 as it is fed between the top and bottom rollers.

As will be seen the rollers 127 pass upwardly through and operate in the front end of the recessed portion 14 of the frame, and mounted in said recessed portion rearwardly thereof and adjacent to an aperture 134 through which the wire or metal 121 passes into the separate parts 68 and 69 of the die are other copper contact and heating rollers 135 and contact casings 136, which are similar in all respects to the construction of the heat rollers 127 and contact casings 129, with the exception that said rollers are not adjustable forwardly and backwardly in the frame, but the heat rollers 135 have the same connection with the frame as the heat rollers 127 have with the carriage 122.

Connected with the top contact casings 129 and 136 are flexible water supply pipes 137 and other flexible pipes 138 connect the top and bottom contact casings, and water discharge pipes 139 are connected with the bottom contact casings. A transformer 140 is mounted in the bottom front portion of the frame and provided with copper leads 141 and 142, the lead 141 is connected with the bottom contact casing 136 and the bottom and top contact casings 136 are connected by a flexible copper strip 143.

The copper lead 142 is enlarged to form a flat head 144, and a movable headed lead 145 is connected with the bottom contact casing 129, and the top and bottom contact casings 129 are connected by a flexible copper strip 146.

Mounted on a stub shaft at the rear end portion of the frame and in the side member 11 is a gear 147, having a beveled gear 148 and bearings 149 are secured to said side of the frame at an angle thereto, and a shaft 150 is rotatably mounted in said bearing, and the ends thereof are provided with beveled gears 151 and 152, the gear 151 meshing with the gear 148. A shaft 153 is mounted in the front bottom portion of the side member 11 of the frame, and the outer end of which is provided with a beveled gear 154 which meshes with the beveled gear 152, and the inner end of which is provided with a beveled gear 155 adapted to mesh with a beveled gear 156 mounted on a governor shaft 157 supported by suitable keepers 158, and a governor 159 is mounted on said shaft and adapted to operate a sleeve having an enlarged annular head 160 to operate a dog 161 pivoted to the side member 11 of the frame and normally operated in one position by a spring 162.

A lever 163 is pivoted in the side member 11 of the frame, as shown at 164, and the inner end of said lever is connected with the headed lead 145 and passed downwardly through the central portion of said lever is a rod 165, the top of which is provided with an adjustable collar 166, between which and the lever is placed a spring 167 adapted to give tension to the lever 163 when in the position to hold the headed lead 145 in contact with the enlarged head 144. The lower end of the rod 165 is provided with a finger 168 adapted to operate in connection with the nose of the dog 161, as hereinafter described.

Pivoted in the front end portion of the frame is a hand-operated lever 169, and said lever is pivoted to the rod 165 forwardly of its pivotal connection with the frame as shown at 170, and by means of this lever the rod 165 may be forced downwardly by hand to bring the headed lead 145 into contact with the enlarged head 144 and hold it in such position for any length of time.

Secured to the shaft 104 is a sprocket wheel 171 and a larger sprocket wheel 172 is secured to the shaft on which the lower roller 135 is mounted, and a chain 173 is mounted on said sprocket wheels, and gears 174 are mounted on the last named shaft, and the shaft of the upper roller 135 and by means of this construction the rotation of the shaft 104 will rotate the shafts of the rollers 135, whereby when the wire 121 is fed into the machine, or into the separate parts of the die, the rollers 135 will aid in such operation and prevent the buckling of the heated metal between the heating rollers 127 and 135.

The shaft 104 is extended to the left of the machine and mounted on the end thereof is a sprocket wheel 175, and a stub shaft 176 is connected with the side member 11 of the frame, and a sprocket wheel 177 is mounted thereon, and a chain 178 connects the sprocket wheels 175 and 177, and secured on the shaft 176 outwardly of the sprocket wheel 177 is a drum 179. Adjustably mounted in the perimeter of said drum is a plurality of pins 180 adapted to operate in connection with the outwardly directed end of the lever 163 to depress the outer end and raise the inner end thereof, and the headed lead 145 connected therewith.

Figure 5:
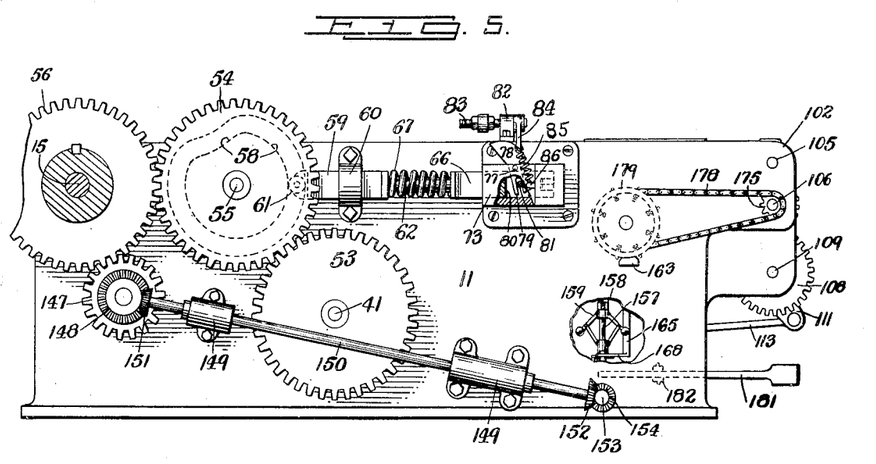
Fig. 5 a view looking in the direction of the arrow 5 of Fig. 3.
Figure 7:
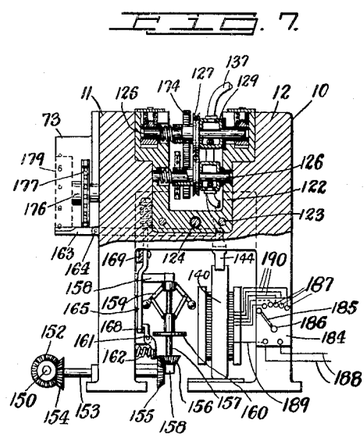
Fig. 7 a transverse section on the line 7—7 of Fig. 1.

The drum 179 is only indicated in dotted lines in Figs. 3, 5 and 7 but is shown in full lines in Fig. 8 for the reason that the same is only employed in connection with the specific means for heating the wire or metal fed into the machine, as hereinafter described. A foot-operated lever 181 is pivoted in the front bottom portion of the side frame member 11 as shown at 182, and the inner end thereof is adapted to operate in connection with a finger 183 on the dog 161 to move the same into an inoperative position whenever desired.

A switch board 184 is secured to the lower end of the front portion of the side member 12 of the frame and on which is mounted a switch mechanism, consisting of a switch arm 185 pivoted at 186 and adapted to make contact with a plurality of contacts 187, five of which are shown, and connected with the switch board are main current wires 188, one of which connects with the pivot of the switch arm at 186, and the other of which connects with the transformer 140 by a wire 189, and wires 190 are connected with the contacts 187 and with the transformer.

With this construction the degree of heat may be regulated by operating the switch arm to increase or decrease the voltage, whereby the volume of heat in various kinds of work pieces may be regulated to produce the desired result.

From the foregoing description, the operation will be readily understood by all those skilled in the art, when taken in connection with the accompanying drawings and the following statement. The various parts of the machine, as shown in Figs. 1 to 7 inclusive, are in position to produce the second operation on the work piece supported between the separate parts 68—69 of the dies. From this position of the parts the crank shaft will advance the plunger 26 to bring the die 37 into contact with the work piece supported between the dies, in which operation the power is transmitted through the coil springs 34, as herein set out, after which the plunger 26 will be moved into position to bring the third and last forming element in the face of the die in line with the work piece, the plunger guide operated by the cam drum 39 serving to produce the above result.

At the end of the above operation the rods 59 and 66 will be moved backwardly by the cam 57 to separate the separate parts 68—69 of the die to bring them into the position indicated in Fig. 9 of the drawing, at which time the feed rollers 105 and 106 will be rotated to advance the wire 121 to an extent limited by the stop finger 88, which has been moved into the position indicated in dotted lines in Fig. 6 by the operation of the rods 59 and 66. The above operation of rotating the feed rollers is accomplished by the operation of the connecting rod 96 which rotates the shaft 109 by means of the pawl 112 pivoted in the side plates 111, the connecting rod 96 being operated to produce this result by the cam 43 or the cam groove 44 therein.

The next step in the operation is the forward movement of the rods 59 and 66 to close the separate parts 68 and 69 of the die member, which operation cuts the wire 121 protruding into and beyond said die and carries the work piece thus formed into line with the center of the plunger, as indicated in dotted lines in Fig. 9 of the drawing. This operation of the die produces the cut and carry result common in machines of this class. In the above operation of closing and separating the separate parts of the die, the die member 69 is moved in one direction by the spring 92, the extent of which movement is limited by the stops 93. In the operation of closing the die members, said member 69 is moved against the tension of the spring 92 by the die member 68 which is held firmly in contact with said first named die member by the toggle lever construction 71 to 75 inclusive.

The work piece 191, as indicated in dotted lines is now in position to permit the plunger to operate thereon to produce the first step in the operation of forming the desired article, it being also understood that the operation of opening and closing the die members to detach the formed article and insert a new work piece is performed, while the plunger guide is moved from the position for performing the last operation into position to produce the first operation, or into the position indicated in Fig. 9 of the drawing. The movement of the plunger guide is controlled by the cam drum 39, and after three successive operations of the plunger the above described operation of opening and closing the die members and moving the plunger guide will be repeated.

As hereinbefore set out the machine, as shown and described is designed to produce an article by three successive operations of the plunger, but as will be readily understood, in some instances, the desired article might be produced by two successive operations of the plunger, or a greater number of operations may be required to produce the desired article, in which event the necessary ratio between the drum shaft 41 and the crank shaft 15 may be attained by adjusting the arm 45 into the desired position, and substituting other pinions and gears for the pinion 50 and gear 51, and by substituting other cams for the cam 43 and cam member 57, and by changing the arrangement of the cam groove 40 on the cam drum 39.

When it is desired to produce an article by a single operation of the plunger, the contacting rod 99 is connected with the arm 94, and the rod 96 is detached therefrom and the gear 42 is disengaged from the pinion 50, or detached from the shaft 41, and the gear 56 is moved from the full line position to the dotted line position shown in Fig. 3 of the drawing, and into mesh with the gear 54 mounted on the stub shaft 55 and another heading die is substituted for the die 37, and the operation of the crank shaft will then advance the plunger 26 through the guide 27 and said plunger and guide are both held against transverse movement by the cam drum 39 and the feed rollers 105 and 106 will be operated by the rod 99 connected at one end with the arm 94 and at the other end with the cam groove 98 in the gear 52, as will be readily understood.

In the above described operation it is presumed that the metal is being heated by or has been heated by the rollers 127 and 135, but in starting the machine or when the metal is first fed thereinto the crank 120 is manipulated to decrease the tension of the feed roller 105 on the roller 104, and the wire 121 is passed between said rollers, and between the heating rollers 127 and 135, it being understood that the headed lead 145 is in the position shown in full lines in Fig. 8, after which the crank 120 is again operated to give tension to the roller 105 and the lever 169 is operated by hand to move the inner end of the lever 163 downwardly and bring the headed lead 145 into contact with the lead 144 and hold it in such position until the metal between the rollers 127 and 135 is heated to the desired extent, after which the machine is started in the usual or any preferred manner, and the above described operation of feeding the metal 121 into the die and cutting off and heading the work piece will be performed, and after the machine has started, the rotation of the crank shaft 15, or the gear 56 mounted on one end thereof will rotate the gear 147 to operate the shaft 150, which in turn operates the governor 159 through the bevel gears 152, 154, 155 and 156 to move its parts from the full line position shown in Fig. 8 to the dotted line position, and the spring 162 will move the dog 161 into engagement with the lower end of the rod 165, or into engagement with the finger 168 thereof, after which the hand lever 169 is released and the dog 161 will serve to hold the headed lead 145 in contact with the lead 144 under the tension of the spring 167.

Should the machine stop accidentally or otherwise without the knowledge of the operator the governor 159 will drop from the position indicated in dotted lines to the position shown in full lines in Fig. 8, and the enlarged circular head 160 will operate to release the dog 161 from the finger 168 of the rod 165, which operation releases the tension of the spring 167 and moves the rod 165 upwardly, and this operation also raises the lever 163 sufficiently to break the connection of the headed lead 145 with the lead 144 thereby shutting off the supply of heat to the heating rollers 127 and 135. It being understood that the lever 163 and rod 165 is moved into its depressed position by means of the hand-operated lever 169 and held in such position by the dog 161, and in this position of the parts the spring 167 is under tension.

The drum 179 is not employed to produce an article, as above described, but when it is desired to heat the metal or wire 121 in spots, said drum is employed and the operation thereof serves to break the connection of the headed lead 145 with the lead 144 at intervals, the number of which will be governed by the size of the article to be produced and the number of operations required to produce the same, and when said drum is used in connection with the rest of the machine, the arrangement of the adjusable pins 180 in the perimeter of said drum will be such that in three revolutions of the crank shaft one of said pins will operate in connection with the lever 163 to hold it in the position shown in full lines in Fig. 8 for the greater part of the three revolutions, but permit said lever to drop into the position shown in dotted lines in said figure long enough to heat the metal at a predetermined point. As will be noted in Figs. 3 and 5 of the drawing, said drum is geared in connection with one of the feed roller shafts 105—106, whereby the same is rotated at the intervals at which the metal is fed into the machine, but my invention is not limited to any specific means for controlling the heating of the metal fed into the machine or the work piece cut therefrom, as various means may be employed in connection with different kinds and classes of work for controlling or operating the heating element involving the rollers 127 and 135.

The adjustment of the heating rollers 127 forwardly and backwardly, or toward and from the rollers 135 is required in order to regulate the amount of metal necessary to be heated, before it is fed into the machine, and the extent of said adjustment will be governed by the size or length of the work piece fed into the dies and protruding therefrom, and this construction, in combination with the heat controlling means involving the switch mechanism mounted on the switch board 184, will permit the adjustment of the machine to the finest degree for producing the desired article in the best possible manner.

The process described and claimed herein as new and the machine described and claimed for carrying said process into effect are intended for use in making various articles of manufacture such as rivets, bolts, screws, spikes, and other headed articles, together with other articles of manufacture that are formed by what is known as forging or upsetting the material fed into the machine and in the foregoing specification the words "wire" and "metal" are used to describe the material fed into the machine and from which the desired article is to be produced and the words "work piece" are used to describe the part cut from said wire or metal and shaped to form said article, and the metal or material fed into the machine, or its form, shape and dimensions will depend on the character of the article to be produced, and on its object or use, and said metal or material may be in the form of coiled wire, rods or bars, and in the foregoing specification, the material fed into the machine is in the form of a wire and the article produced from the work piece is a spike or nail; but it will be understood that a work piece just long enough to form the desired article may be fed into the machine and treated as hereinbefore described, if desired, to form said article, and this invention is not strictly limited to the use of long metal wires, rods or bars which are fed into the machine as hereinbefore described, and from which the work piece is cut.

While the general form of the apparatus herein shown and described and the method of operation are applicable as hereinbefore set out to the manufacture of various articles of manufacture, it will be understood that the form, construction and operation of the die or die members will be determined by the article or articles which it is desired to produce, and said die or die members may be of any preferred form and construction and by properly forming or constructing said die or die members, bearing balls, poppet valves, screw blanks, shackle bolts and similar articles may be produced by the method and apparatus herein described.

The means for operating the crank shaft 15 is not indicated in the drawing, but it will be understood that the same may be operated by a belt from a power shaft connected with either of the fly wheels 16 in the usual manner, or any other means may be employed for producing this result.

The contact and heating rollers 127 and 135 are arranged in pairs, one of which is adjustable toward and from the other, as hereinbefore described, and each pair of said rollers form the electrodes of the heating element and by means of the water jackets 129 and 136 said electrodes are provided with a cooling means as will be readily understood.

The plunger 26 is made adjustable toward and from the work piece holder die by means of the headed pin 25, and the object of this construction is to provide means whereby the plunger may be adjusted and thus adapted to different classes of work or to work pieces of various sizes or dimensions.

While I have shown and described the details of the construction of a machine of the class specified designed for use in the production of various articles, my invention is not limited to such details, and changes therein and modifications thereof may be made, within the scope of the appended claims without departing from the spirit of my invention or sacrificing its advantages.

Having fully described my invention, what I claim as new and desire to secure by Letters Patent, is:—

1. A machine of the class described provided with a workpiece holder die, means for automatically feeding material into said holder die, means for electrically heating the material as it is fed into said die, and means for automatically shutting off the supply of heat on the stoppage of the machine.

2. In a machine for forming various articles, a pair of main feed rollers for feeding material into said machine, and a heating element mounted rearwardly of said feed rollers and comprising two pair of contact rollers, the contact rollers of each pair being in an open electric circuit which is closed by material fed therebetween, means for regulating the degree of heat applied to the material passed between said rollers, and automatic means for breaking the circuit to said rollers when the means for feeding said material therebetween stops.

3. The method of forming articles of manufacture in a machine of the class described, which consists in feeding material into the machine, electrically heating the material as it is fed into the machine by passing it between electrodes spaced longitudinally of and on opposite sides of said material, cutting off a workpiece from said heated material and suitably fashioning said workpiece to form the desired article.

4. The method of forming certain articles of manufacture in a machine of the class described, which consists in providing a suitably constructed die, electrically heating material fed into the machine by passing it between electrodes spaced longitudinally of and on opposite sides of said material, feeding said heated material into the die and upsetting a part of the material in said die to form the desired article.

5. A machine of the class described provided with a die, means for feeding material into the machine, means for electrically heating said material as it is fed into the machine by passing said material between two pairs of electrodes spaced longitudinally of said material and on opposite sides thereof, means for feeding said heated material into said die and means for fashioning the material in said die to form the desired article.

6. In a machine of the class described for forming various articles, means for feeding material into the machine, means for electrically heating said material as it is fed into the machine by passing it between electrodes spaced longitudinally of and on opposite sides of said material, means for cutting off a part of said heated material to form a workpiece and for moving said workpiece into position to be operated upon by a forming element or elements and means for operating said forming element or elements to form the desired article.

7. In a machine of the class described for forming various articles, means for feeding material into the machine, means for electrically heating said material as it is fed into the machine by passing it between electrodes spaced longitudinally of said material, means for adjusting said electrodes toward and from each other whereby the amount of material therebetween to be heated may be varied and means involving one of said electrodes for moving said heated material into position to be operated upon by a forming element or elements to form the desired article.

8. In a metal working machine for forming articles of manufacture, means for feeding material into the machine, means for electrically heating a predetermined part of said material as it is fed into the machine, means comprising part of the heating means for feeding the heated material further into the machine, means for cutting off said heated material to form a workpiece, and means for fashioning said workpiece to form the desired article.

9. A metal working machine for forming articles of manufacture involving an electric heater, means for feeding the material into said heater for electrically heating a predetermined part of said material, means for cutting off the heated part of said material to form a workpiece, means for moving the workpiece into position to be operated upon by fashioning devices, and fashioning devices operating on said workpiece to form the desired article.

10. A continuous method for forming articles of manufacture is a metal working machine which consists in mechanically feeding material into the machine, electrically heating a predetermined part of said material as it is fed from said mechanical feeder, feeding the heated material farther into the machine, cutting off the heated portion to form a workpiece and fashioning said workpiece to form the desired article.

11. A continuous method for forming articles of manufacture in a metal working machine which consists in mechanically feeding material into the machine, electrically heating a predetermined part of said material as it is fed from said mechanical feeder, cutting off the heated portion of said material to form a workpiece, moving said workpiece into position to be operated upon by fashioning elements and then fashioning said workpiece to form the desired article.

12. A continuous method for forming articles of manufacture in a metal working machine which consists in mechanically feeding material into the machine, electrically heating a predetermined part of said material as it is fed from said mechanical feeder, feeding the heated portion of said material farther into the machine, cutting off the heated portion of said material to form a workpiece, moving said workpiece into position to be operated upon by fashioning elements and then fashioning said workpiece to form the desired article.

In testimony that I claim the foregoing as my invention I have signed my name in presence of the subscribing witnesses this 17th day of November, 1916.

FRANK P. KOBERT.

Witnesses:
C. E. MULREANY,
H. E. THOMPSON.